Oct. 5, 1965 L. J. HOLTZ 3,210,069
HOLD-DOWN CLAMP
Filed April 16, 1963
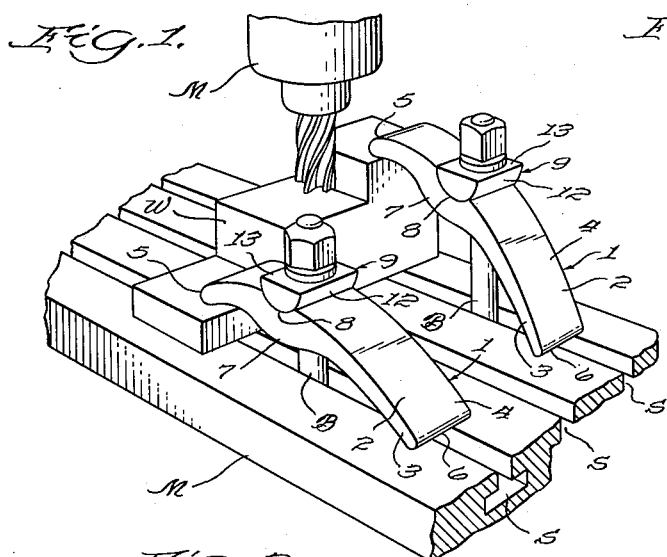
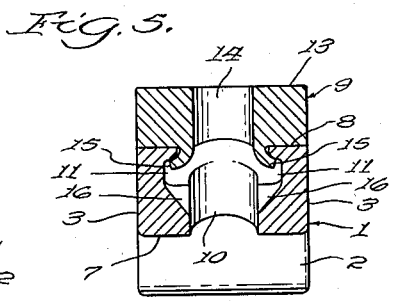
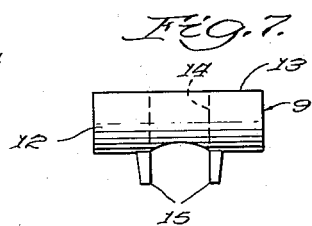
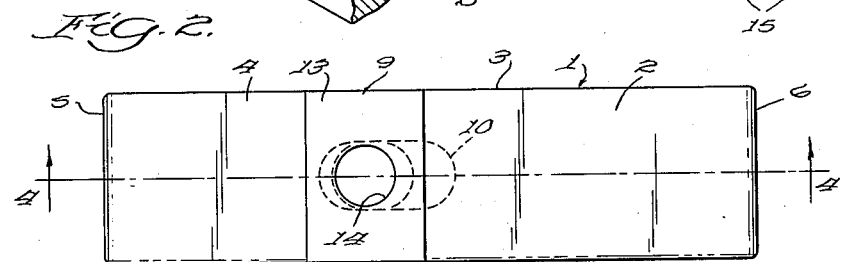
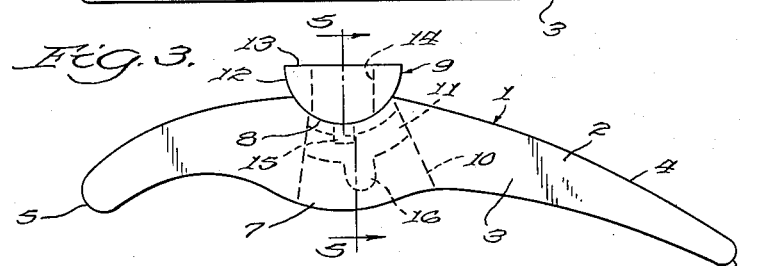
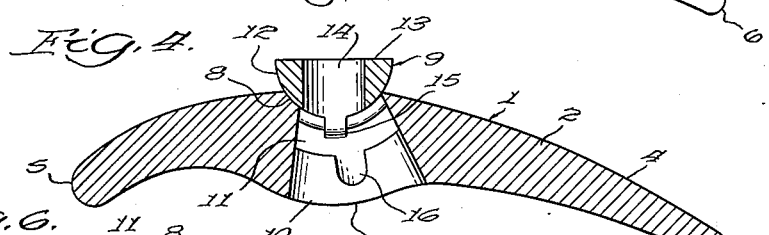
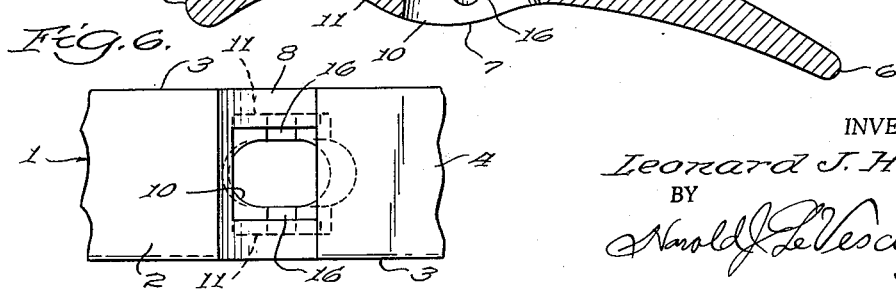
INVENTOR.
Leonard J. Holtz.
BY
Harold J. LeVescouté
Atty.

United States Patent Office 3,210,069
Patented Oct. 5, 1965

3,210,069
HOLD-DOWN CLAMP
Leonard J. Holtz, 9474 Wayside Drive, Sunland, Calif.
Filed Apr. 16, 1963, Ser. No. 273,394
2 Claims. (Cl. 269—94)

This invention relates to hold-down clamps particularly adapted for holding work pieces on the work supporting surfaces of machine tools and the like.

The principal object of the invention is to provide a hold-down clamp device which in combination with a bolt, adjusts itself automatically to present a surface which is parallel to the end face of a nut and washer means of the associated bolt at all angles assumed by the clamp as it engages both the work supporting surface to which the work is to be clamped and a surface of the work piece engaged and clamped to the work supporting surface.

Another object of the invention is to provide a work clamp of the foregoing type in which the relatively movable components are permanently interconnected while having freedom to move relatively to one another in the self-adjusting range of movement of the device.

A further object of the invention is to provide a work hold-down clamp of the above character which is so designed as to be formed with little or no machining of the component parts.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is a perspective view of a pair of clamps embodying the present invention employed to clamp different portions of a workpiece to a machine tool table with the said different portions of the workpiece disposed at different distances above the table to indicate the positions assumed by the clamp in uses approximating the maximum and minimum extent of range of the illustrated embodiment, FIG. 2 is an enlarged scale, top plan view of one of the clamps shown in FIG. 1, FIG. 3 is a side elevational view of the clamp shown in FIG. 2, FIG. 4 is a longitudinal section taken on the line 4—4 of FIG. 2, FIG. 5 is a transverse sectional view taken on the staggered line 5—5 of FIG. 3, FIG. 6 is a fragmentary top plan view of the body component showing the curved seat or groove for the rocker component, and FIG. 7 is a side elevational view of the rocker component of the clamp device prior to the assembly thereof into the body component.

In the following specification of the disclosed embodiment of the invention reference will be made to such terms as top surface, bottom surface, sides, and the like, and such designations will be understood to have reference only to the attitude of the device shown in the drawings and to have no relation to such other positions as the device may assume in actual use.

Referring to the drawings and particularly to FIG. 1, there is shown a workpiece W secured to the table of a milling machine M by a pair of clamps 1, 1 embodying the present invention together with a pair of bolts B, B having the heads thereof (not shown) disposed in the "T" portions of slots S, S in the table of the milling machine.

Each clamp comprises an elongated rigid body 2 comprising a casting or forging preferably of uniform width as viewed in plan and of modified crescent shape as viewed in side elevation; said body having parallel flat sides 3, 3 and having a force receiving top surface 4 which is preferably generally convexly curved longitudinally of the body member and which is transversely flat as shown in FIGS. 2 and 3. Rearwardly from the rounded forward end 5 and forwardly of the rounded rear end 6 of the body member the portions of the bottom surface of the body member are generally correspondingly concavely curved with reference to the top surface and the adjacent ends of said concavely curved bottom surface portions are interconnected by an intervening convexly curved portion 7 which appreciably increases the thickness of the body member 1 at a point between the front end 5 and the midlength of the body member; it being noted that said bottom and top surfaces combine to give said body member a modified crescent shape or configuration as viewed in side elevation.

A wide transverse groove 8 of circular segmental cross section is formed in the top surface of the body member directly above the convexly curved bottom surface portion 7 to form a seat for a rocker component 9 to which further reference will be made. Extending through the body member 1 from the bottom of the groove 8 to the under side of the curved portion 7 is an opening 10 disposed midway between the sides 3, 3 of the body member and which at its juncture with the bottom of the groove 8 is of slightly oval configuration longitudinally of the body member 1 and at its emergence through the convexly curved bottom surface portion 7 is of much greater diameter longitudinally of the body member than at its upper end as best shown in FIGS. 4 and 6 to afford clearance for the bolt B as the clamp is applied in greater or lesser inclined positions. The sides of the hole or opening 10 closely adjacent the bottom surface of the groove 8 are provided with grooves or channels 11, 11 disposed in parallel curved relation to the groove 8 and planar parallel relation to the sides 3, 3.

The rocker component 9 is formed in substantially semi-cylindrical cross section as viewed in end elevation including a curved bearing portion or surface 12 conforming to the curvature of the groove 8 and a flat top surface 13. A bolt receiving hole 14 extends through the rocker component intermediate its ends and at right angles to the top surface 13 and a pair of malleable spur elements 15, 15 extend into the opening 10 in the body member at each side of the hole 14; the ends of said spurs being bent oppositely laterally into the grooves 11, 11 (see FIG. 5) to retain the rocker component loosely in assembly with the body member 1. Preferably, upwardly and outwardly inclined clearance notches 16, 16 are formed in the body member 1 to enable a tool to be inserted from the bottom of the hole or opening 10 to engage and bend the spurs 15, 15 laterally into the grooves 11, 11.

The mode of use is believed to be obvious. A bolt B extends through the opening 10 and the aligned hole 14 in the rocker component and preferably has a closer fit with the latter than with the opening 10. The respective ends of the clamp are engaged with the workpiece or other object to be secured and the surface to which it is to be secured with the head of the bolt suitably secured in the surface which is usually in the T-slot of the work table of a machine tool. On tightening the bolt, the rocker component accommodates itself to the angle assumed by the body member and the rounded ends 5 and 6 of the body member assure proper line contacts with the surfaces upon which they rest and impose the force developed by the bolt B; it being noted that a wide range of angular positions is afforded. This eliminates the common practice of using an ordinary flat bar as a clamp member with a bolt extending through the member between its ends and having one end engaging the surface of the workpiece and the other engaging blocking material of suitable height. Since the rocker component is permanently assembled to the body member, the clamp is ready for use without the loss of time and annoyance of trying to find suitable blocking for the rear end of the clamp.

While in the foregoing specification there has been disclosed a presently preferred embodiment of the invention, it is appreciated that in the light of this disclosure changes and modifications may suggest themselves to others skilled in the art to which the invention appertains. Accordingly, it will be understood that the invention is not to be deemed to be limited to the precise details of construction thus disclosed and that the invention includes as well all such changes and modifications in the parts and in the construction, combination and arrangement of parts as shall come within the purview of the appended claims.

I claim:

1. In a hold-down clamp device, a body member of elongated rectangular configuration in plan and including a force receiving surface and oppositely disposed, force imposing end portions, a groove of circular segmental configuration formed in said force receiving surface and extending transversely of said body member from side to side thereof, a rocker member having a semicylindrical cross section mounted for rocking movement in said groove, a bolt receiving hole extending through said rocker member between the ends thereof and at right angles to said force receiving surface, a complementary bolt receiving hole extending through said body member from the bottom of said groove to the opposite side thereof, and interengaging means extending between said members operative to hold them loosely in assembly while allowing relative rocking movements therebetween; said interengaging means comprising a pair of spur receiving grooves formed in the sides of said hole in said body member disposed parallel to the sides of said body member and parallel to the curvature of the bottom of said groove in which said rocker member is mounted and a pair of spur elements depending from said rocker member adjacent to the sides of said hole in said body member in which said spur receiving grooves are formed and thence extending laterally one each into one each of said pair of spur receiving grooves.

2. In a hold-down clamp device, an elongated body member of modified crescent shape as viewed in side elevation and being of substantially uniform width defined by parallel side surfaces, said body member having a transverse groove of uniform circular segmental cross section disposed on the convex face thereof and extending between the said side surfaces and disposed between the midlength of said body member and one end thereof, a rocker member of substantially semi-circular configuration loosely seated in said groove and having the flat side surface thereof disposed beyond the plane of the convex surface of said body member in which said groove is formed, a bolt receiving hole extending through said rocker member at a point intermediate the ends thereof and extending in a direction normal to said flat surface thereon through the curved side of said rocker member, a complementary bolt receiving hole extending through said body member from the bottom of said groove to the side of said body member opposite said convex face thereof; said last named hole being of oval configuration with the minor diameter thereof being substantially uniform and extending transversely of said body member and the major diameter of said hole being substantially greater at the point of juncture with said opposite side of said body member, and interlocking means extending between said rocker member and said body member effective to maintain said members in assembly; said interlocking means comprising a pair of grooves formed one each at each side of said hole in said body member and said grooves being curved substantially parallel to the bottom of said transverse groove, and a pair of spur elements extending from said rocker member into said hole in said body member and thence extending laterally one each into one each of said pair of grooves.

References Cited by the Examiner

UNITED STATES PATENTS

| | | | |
|---|---|---|---|
| 2,365,079 | 12/44 | Huber | 269—93 X |
| 2,672,790 | 3/54 | Carroll | 269—258 X |
| 3,045,658 | 7/62 | Sampietro | 123—90 |

FOREIGN PATENTS 732,303  6/55  Great Britain.

ROBERT C. RIORDON, *Primary Examiner.*